(12) United States Patent
Hirokawa et al.

(10) Patent No.: US 9,753,289 B2
(45) Date of Patent: Sep. 5, 2017

(54) HEAD UP DISPLAY DEVICE

(71) Applicant: NIPPON SEIKI CO., LTD., Niigata (JP)

(72) Inventors: Takuro Hirokawa, Niigata (JP); Takeshi Yachida, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/915,168

(22) PCT Filed: Sep. 16, 2014

(86) PCT No.: PCT/JP2014/074368
§ 371 (c)(1),
(2) Date: Feb. 26, 2016

(87) PCT Pub. No.: WO2015/041203
PCT Pub. Date: Mar. 26, 2015

(65) Prior Publication Data
US 2016/0209663 A1    Jul. 21, 2016

(30) Foreign Application Priority Data

Sep. 20, 2013    (JP) ................................. 2013-195574

(51) Int. Cl.
*G02B 27/14*    (2006.01)
*G03H 1/00*    (2006.01)
(Continued)

(52) U.S. Cl.
CPC ..... *G02B 27/0179* (2013.01); *G02B 27/0101* (2013.01); *G02B 27/0149* (2013.01);
(Continued)

(58) Field of Classification Search
CPC ............ G02B 27/0172; G02B 27/0103; G02B 27/0101; G02B 3/0056; G02B 27/0149;
(Continued)

(56) References Cited

U.S. PATENT DOCUMENTS

| 4,806,904 A * | 2/1989 | Watanuki ........... G02B 27/0149 340/438 |
| 2009/0201225 A1* | 8/2009 | Okada .................... G02B 27/01 345/7 |
| 2010/0073636 A1 | 3/2010 | Sasaki et al. |

FOREIGN PATENT DOCUMENTS

| JP | 60-183240 A | 9/1985 |
| JP | 61-133425 U | 8/1986 |

(Continued)

OTHER PUBLICATIONS

International Search Report and Written Opinion issued in related Int'l Application No. PCT/JP2014/074368, dated Nov. 11, 2014 (w/English Translation of ISR).

*Primary Examiner* — Dawayne A Pinkney
(74) *Attorney, Agent, or Firm* — McDermott Will & Emery LLP

(57) ABSTRACT

Provided is a head up display device with which it is possible to adjust the projection location of display light depending on the height of the observer's point of view, without moving the virtual image in the vertical direction. This head up display device is provided with: a case which retains a display and a concave mirror in a prescribed positional relationship; a first driving means which rotates the concave mirror; a second driving means which moves the case frontward and rearward; and a control means which operates the first and second drive means in accordance with information about the viewpoint position of the observer,
(Continued)

and adjusts the projection location of display light (L) on front glass depending on the height of the observer's point of view.

10 Claims, 6 Drawing Sheets

(51) Int. Cl.
*G09G 5/00* (2006.01)
*G02B 27/01* (2006.01)
*G06K 9/00* (2006.01)
*G06T 5/00* (2006.01)

(52) U.S. Cl.
CPC .......... *G06K 9/00604* (2013.01); *G06T 5/001* (2013.01); *G02B 2027/014* (2013.01); *G02B 2027/0154* (2013.01); *G02B 2027/0181* (2013.01)

(58) Field of Classification Search
CPC .... G02B 27/144; G02B 27/145; G03B 21/56; G03B 21/625; G03B 21/602; B29L 2011/0016; B29D 11/0073
USPC ........ 359/631, 626, 618–621, 443, 454–455, 359/632, 633, 630, 629, 13; 345/7
See application file for complete search history.

(56) References Cited

FOREIGN PATENT DOCUMENTS

| | | |
|---|---|---|
| JP | 63-133417 U | 8/1988 |
| JP | 05-229366 A | 9/1993 |
| JP | 07-329603 A | 12/1995 |
| JP | 2010-072455 A | 4/2010 |
| JP | 2010-179918 A | 8/2010 |

* cited by examiner

HEAD UP DISPLAY DEVICE

CROSS REFERENCE

This application is the U.S. National Phase under 35 U.S.C. §371 of International Application No. PCT/JP2014/074368, filed on Sep. 16, 2014, which claims the benefit of Japanese Application No. 2013-195574, filed on Sep. 20, 2013, the entire contents of each are hereby incorporated by reference.

TECHNICAL FIELD

The present invention relates to a head up display device.

BACKGROUND ART

A display device for a vehicle called a head up display projects display light representing a display image emitted from a display onto a front glass or a dedicated combiner, and enables an observer (mainly, a driver) to recognize a virtual image of the display image superimposed on a scene viewed through a front glass or the like. On the other hand, a height of observer's viewpoint is not constant due to differences in physique and driving posture. Thus, it is necessary to adjust a projection point of display light in a vertical direction depending on the height of observer's viewpoint to enable the observer to recognize a virtual image even when the height of observer's viewpoint changes. As a conventional method of compensating for differences in the height of observer's viewpoint, a head up display disclosed in Patent Literatures 1 to 3 is known.

CITATION LIST

Patent Literature

Patent Literature 1: Japanese Unexamined Patent Application Publication No. 5-229366
Patent Literature 2: Japanese Unexamined Patent Application Publication No. 7-329603
Patent Literature 3: Japanese Unexamined Patent Application Publication No. 2010-179918

SUMMARY OF THE INVENTION

Problems to be Solved by the Invention

The head up display disclosed in Patent Literature 1 is configured to vertically adjust a projection position of display light on a front glass or the like by enabling adjustment of inclination of a plane mirror for reflecting display light from a display toward a front glass or the like. However, in such a configuration, an incident position and an incident angle of display light to a front glass or the like are uniquely determined simultaneously with the adjustment of a display light projection position. Thus, a virtual image is vertically moved and deviated in superimposition with scenery.

The head up display disclosed in Patent Literature 2 is configured to move both a display and a concave mirror (an optical path changing means) for directing display light to a front glass, along an arc centered on an intersection where a first temporary sight line of a first sight line and a second sight line intersects. The first temporary sight line of the first sight line is reflected and directed to a front glass. The first sight line is a sight line of a passenger viewing an image at a predetermined position outside a front glass from a high eye position. The second sight line is a sight line of a passenger viewing an image at a predetermined position outside a front glass from a low eye position. With such a configuration, it is possible to adjust a projection position of display light to a front glass without vertically moving a virtual image position. However, space is required in longitudinal and vertical directions for moving the display and the concave mirror along the arc, increasing the size of the head up display.

The head up display disclosed in Patent Literature 3 is configured to arrange a display, a semitransparent reflection mirror, and optical elements for image expansion (including a second reflection mirror), in order at intervals along a longitudinal direction of a vehicle. With this configuration, display light is partially reflected by the second reflection mirror through the semitransparent reflection mirror, enlarged by the optical elements for image expansion, and reflected to the front glass by the semitransparent reflection mirror. The semitransparent reflection mirror is configured movable in a longitudinal direction and variable in an inclination angle, and the display and the second reflection mirror are not configured movable. With such a configuration, like in the Patent Literature 2, a projection position of display light onto a front glass is adjustable without vertically moving a virtual image position. However, there has been a problem that the semitransparent reflection mirror decreases brightness of a virtual image.

The present invention has been made in view of the above. Accordingly it is an object of the invention to provide a head up display device capable of adjusting a projection position of display light depending on a height of observer's viewpoint without moving a virtual image in a vertical direction.

Solution to Problem

To achieve the above object, a head up display device according to the present invention reflects display light representing a display image emitted from a display by a concave mirror, and projects the display light to a combiner, the head up display device comprising:
  a case that retains the display and the concave mirror in a prescribed positional relationship;
  a first driving means that rotates the concave mirror;
  a second driving means that moves the case forward and rearward; and
  a control means that operates the first and second driving means according to information about a viewpoint position of an observer, and adjusts a projection position of the display light on the combiner depending on a height of observer's viewpoint.

Effect of the Invention

According to the present invention, the head up display device is possible to adjust a projection position of display light depending on a viewpoint height of an observer, without moving a virtual image in a vertical direction.

MODE FOR CARRYING OUT THE INVENTION

Hereinafter, an embodiment of the present invention will be described with reference to the drawings.

Figure 1:
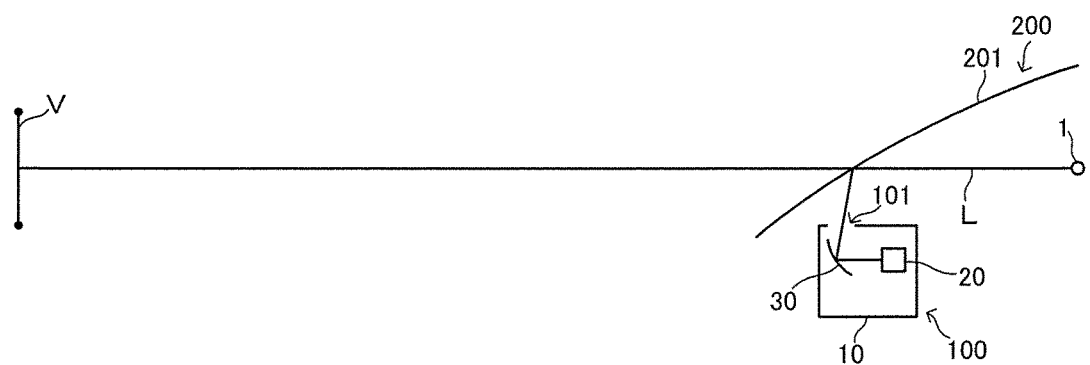
FIG. 1 is a schematic diagram showing an outline of a head up display device according to an embodiment of the present invention.

FIG. 1 shows an outline of a head up display device according to the embodiment. A head up display device 100 according to the embodiment is installed in a dashboard of a vehicle 200. The head up display device 100 emits display light L representing a display image from an emitting part 101 to a front glass 201 of the vehicle 200. The display light L reflected by the front glass 201 reaches an eye 1 of an observer. The observer recognizes a virtual image (a virtual image projected on the front glass 201) V of the display image represented by the display light L reflected by the front glass 201. The observer recognizes a display image though the front glass 201 as if it is located distant and superimposed on a scene in front of the vehicle 200.

Figure 2:
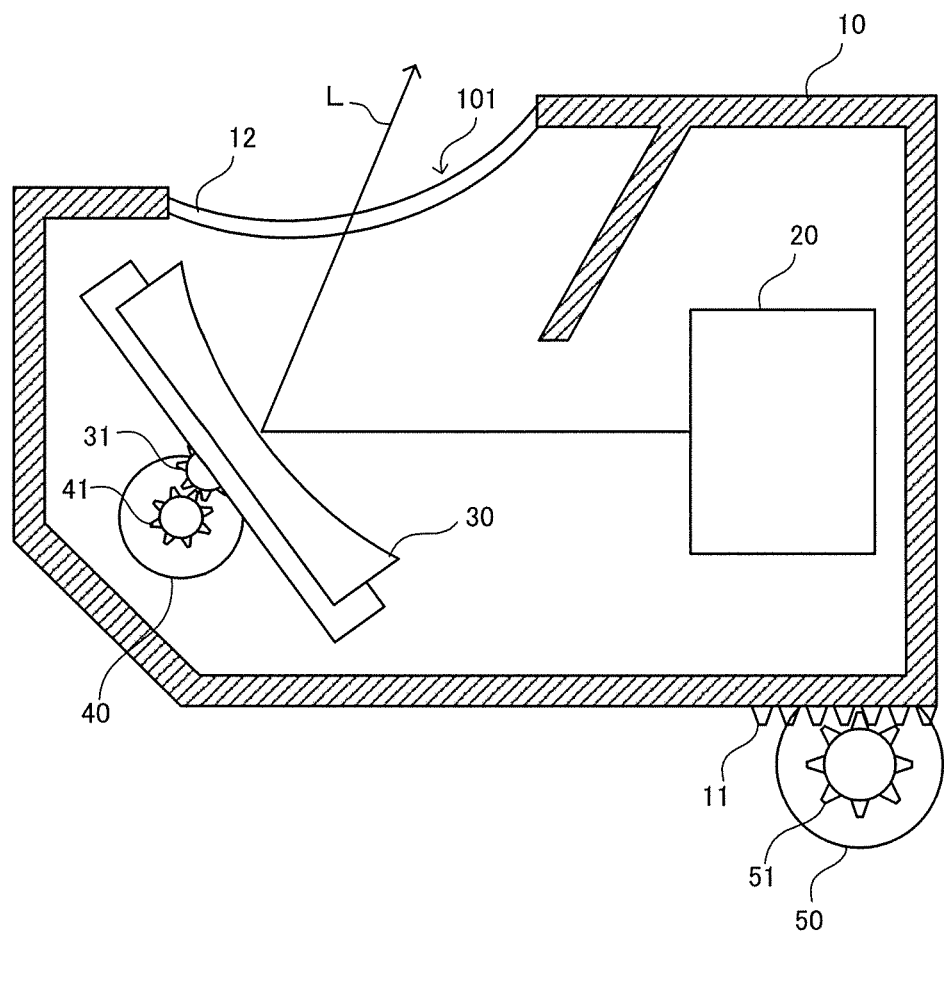
FIG. 2 is a schematic cross-sectional view showing a configuration of a head up display device according to an embodiment of the invention.
Figure 3:
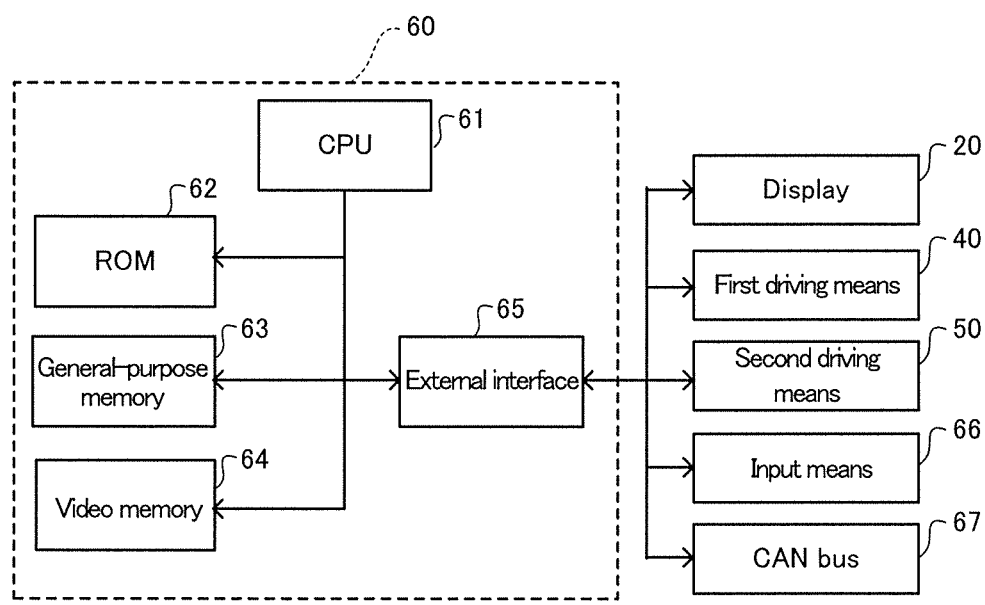
FIG. 3 is a block diagram showing an electrical configuration of a head up display device according to an embodiment of the invention.

FIG. 2 shows an outline of a cross section of the head up display device 100 in a horizontal direction of the vehicle 200 (FIG. 1). FIG. 3 shows an electrical configuration of the head up display device 100.

The head up display device 100, as shown in FIG. 2, comprises a case 10, a display 20, a concave mirror 30, a first driving means 40, a second driving means 50, and a control means 60.

The case 10 is a substantially box-shaped member made of a metal material such as aluminum. The case 10 is provided with various mounting shapes (not shown) inside, and able to retain the display 20 and the concave mirror 30 in a prescribed positional relationship in this embodiment. The inner surface of the case 10 is painted black, for example, to be less likely to occur stray light due to the outside and the display 20. On the bottom surface of the case 10, a rack 11 is provided. The rack is provided with a plurality of teeth formed like a row in a longitudinal direction of the vehicle 200, and engaged with a gear 51 of the second driving means 50. Thus, the case 10 is provided movable in the longitudinal direction along with the rotational drive of the second driving means 50. On the top surface of the case 10, an opening is provided as the emitting part 101 for emitting the display light L. The emitting part 101 is provided with a cover 12 made of transparent resin material to cover the opening.

The display 20 comprises a TFT liquid crystal display element, for example, and an LED light source for transmilluminating the liquid crystal display element from the back side. The display 20 displays time and vehicle information such as vehicle traveling speed and f remaining fuel amount as a display image, and emits display light L representing the display image to the concave mirror 30.

The concave mirror 30 is formed by depositing a reflective layer made of metal material such as aluminum on a resin substrate made of polycarbonate, for example. The concave mirror is arranged with the reflective surface faced upwardly inclined with respect to the display surface of the display 20, and magnifies and reflects the display light L emitted from the display 20 to the emitting part 101. The concave mirror 30 is provided with a gear 31 on the side opposite to the reflective surface (front side in FIG. 2). The gear 31 engages with a gear 41 of the first driving means 40. Thus, the concave mirror 30 is provided to be able to adjust an angle (rotation) in a longitudinal direction along with the rotational drive of the first driving means 40.

The first driving means 40 comprises a stepping motor, for example, and is provided with the gear 41 in the rotation axis. The first driving means 40 is disposed within the case 10, and the gear 41 is engaged with the gear 31 of the concave mirror 30. Thus, along with the rotational drive of the first driving means 40, an inclination angle in the longitudinal direction of the concave mirror 30 is adjusted.

The second driving means 50 comprises a stepping motor, for example, and is provided with the gear 51 in the rotation axis. The second driving means 50 is disposed in a lower part of the case 10, and the gear 51 is engaged with the rack 11 of the case 10. Thus, along with the rotational drive of the second driving means 50, the case 10 becomes movable in the longitudinal direction.

The control means 60, as shown in FIG. 3, controls the display 20, the first driving means 40, the second driving means 50, etc. For example, the control means 60 sends an image signal to the display 20 to control the display 20 (to display a display image). The control means 60 comprises a CPU (Central Processing Unit) 61, a ROM (Read Only Memory) 62, a general-purpose memory 63, a video memory 64, an external interface 65, and the likes. The external interface 65 is connected to a CAN (Control Area Network) bus 67 for transmitting and receiving information about the display 20, the first driving means 40, the second driving means 50, and the vehicle 200. Further, the external interface 65 is connected to an input means 66, which accepts viewpoint position information (key input information and captured image information from an imaging means for imaging the eye 1 of the observer) for adjusting the inclination angle of the concave mirror 30 and the longitudinal position the case 10.

In this embodiment, the front glass 201 is a glass having a predetermined curved surface (convex to the outside direction of the vehicle 200) (FIG. 1). In this embodiment, the display light L emitted from the display 20 is expanded by the concave mirror 30, and reflected back toward the emitting part 101. The display light L emitted from the emitting part 101 to the outside is projected on the front glass 201 of the vehicle 200. The display light L projected on the front glass 201 reaches the eye 1 of the observer. The observer recognizes a virtual image V of a display image represented by the display light L reflected by the front glass 201 as if it is superimposed on a scene in front of the vehicle 200.

Figure 4:
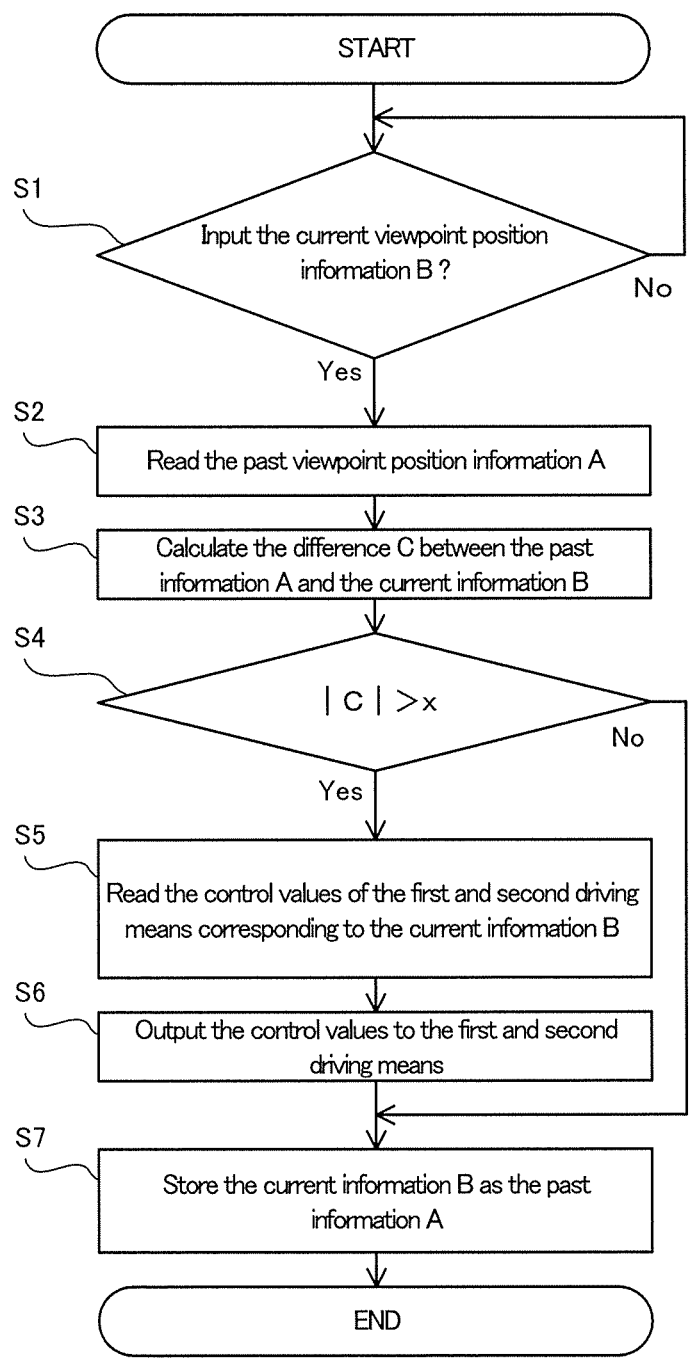
FIG. 4 is a flowchart showing a method of controlling first and second driving means according to an embodiment of the invention.

Next, a method of controlling the first and second driving means provided in the head up display device 100 will be described by using FIG. 4.

The CPU 61 of the control means 60, in step S1, inputs current viewpoint position information B (including at least height) of the observer. The viewpoint position information may be key input information made by the observer by operating a not-shown switch means based on an own viewpoint position, or may be captured image information input at predetermined time intervals from an image pickup means, which is provided for imaging a face of the observer (including at least the eye 1 of the observer). The CPU 61 moves to step S2 after inputting the current viewpoint position information B in step S1.

Next, the CPU 61, in step S2, reads past (previous) viewpoint position information A stored in the general-purpose memory 63, and in step S3, calculates a difference C between the past viewpoint position information A and the current viewpoint position information B.

Next, the CPU 61, in step S4, determines whether an absolute value of the difference C is greater than a predetermined threshold value x ($|C|>x$). When the absolute value of the difference C is greater than the threshold value x ($|C|>x$) in step S4, or when a change in the observer's viewpoint position (a change in a vertical direction) is greater than a predetermined value, the CPU 61 moves to step S5. When the absolute value of the difference C is smaller than or equal to the threshold value x ($|C|\le x$) in step S4, or when a change in the observer's viewpoint position is smaller than or equal to a predetermined value, the CPU 61 moves to step S7.

The CPU 61, in step S5, reads, respectively the control values (correction values) of the first driving means 40 and the second driving means 50 corresponding to the current viewpoint position information B from the general-purpose memory 63. Then, the CPU 61, in step S6, outputs the control values to the first driving means 40 and the second driving means 50. The control values of the first driving means 40 and the second driving means 50 are set in a plural number in being associated with a plurality of values of viewpoint position information, for example, and stored in the general-purpose memory 63 as a data table. The first driving means 40 rotates based on the input control value, and adjusts the inclination angle of the concave mirror 30. The driving means 50 rotates based on the input control value, and moves the longitudinal position the case 10 (i.e., the longitudinal positions of the display 20 and the concave mirror 30).

The CPU 61, in step S7, stores the current viewpoint position information B as the past viewpoint position information A in the general-purpose memory 63, and updates the past viewpoint position information A.

Figure 5:
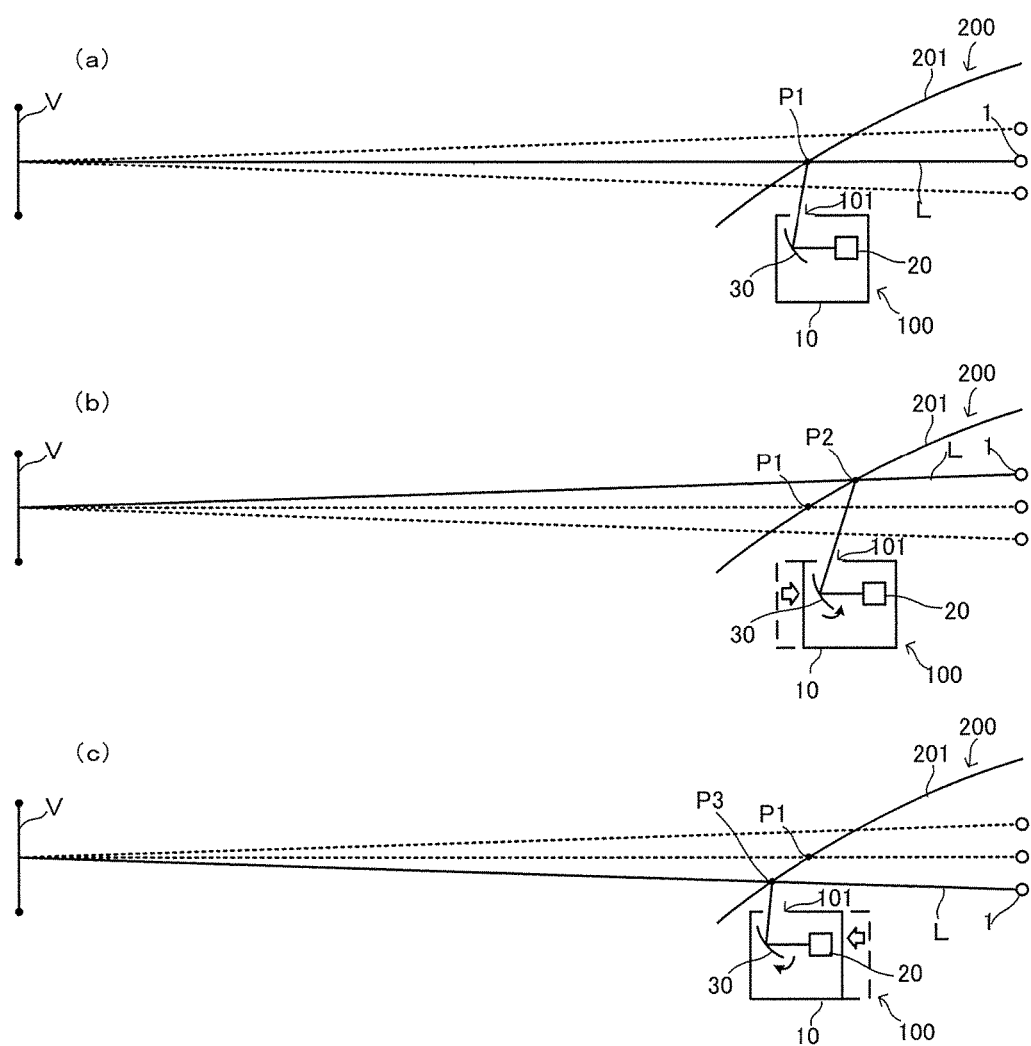
FIG. 5 is a schematic diagram for explaining a method of adjusting a projection position of display light according to an embodiment of the invention.

By repeatedly executing the above control until the power is turned off, the CPU 61 operates the first driving means 40 and the second driving means 50 according to the current viewpoint position information B of the observer, and moves the inclination angle of the concave mirror 30 and the longitudinal positions of the case 10. As a result, the CPU 61 can adjust the projection position of the display light L depending on the height of the observer's viewpoint position. FIG. 5 shows specific examples of a method of adjusting the projection position of the display light L.

FIG. 5 (*a*) shows the case where the height of the eye 1 of the observer (viewpoint position) is located in a reference position (e.g., in the middle of upper and lower sides of an eye box). In this case, the display light L emitted from the emitting part 101 of the head up display device 100 is projected onto a predetermined projection point P1 on the front glass 201. The display light L reflects on the front glass 201, and reaches the eye 1 of the observer. The virtual image V of the display image is recognized at an arbitrary position in front (for example, 10~20 m forward) of the front glass 201.

FIG. 5 (*b*) shows the case where the height of the eye 1 of the observer moves to a higher position with respect to the reference position. At this time, the CPU 61 executes the above control method, and controls the first driving means 40 and the second driving means 50 depending on the input of the current viewpoint position information B. In this case, the second driving means 50 rotates to move the case 10 rearward, and at the same time, the first driving means 40 rotates to move the concave mirror 30 counterclockwise in FIG. 5, namely, to incline the upper end of the concave mirror 30 forward, thereby adjusting the inclination angle of the concave mirror 30 more upward. As a result, the display light L emitted from the emitting part 101 is projected onto a projection point P2 located more upward the projection point P1 on the front glass 201. The display light L reflected by the front glass 201 reaches the eye 1 of the observer to be overlapped with the line of sight toward the arbitrary position in front of the front glass 201. Therefore, the observer can recognize the virtual image V even at a viewpoint higher than the reference position, without moving in a vertical direction from the position of the virtual image V at the reference position.

FIG. 5 (*c*) shows the case where the height of the eye 1 of the observer moves to a lower position with respect to the reference position. At this time, the CPU 61 executes the above control method, and controls the first driving means 40 and the second driving means 50 depending on the input of the current viewpoint position information B. In this case, the second driving means 50 rotates to move the case 10 forward, and at the same time, the first driving means 40 rotates to move the concave mirror 30 clockwise in FIG. 5, namely, to incline the upper end of the concave mirror 30 rearward, thereby adjusting the inclination angle of the concave mirror 30 more downward. As a result, the display light emitted from the emitting part 101 is projected to a projection point P3 located more downward the projection point P1 on the front glass 201. The display light L reflected by the front glass 201 reaches the eye 1 of the observer to be overlapped with the line of sight toward the arbitrary position in front of the front glass 201 from the eye 1 of the observer. Therefore, the observer can recognize the virtual image V even at a viewpoint lower than the reference position, without moving in a vertical direction from the position of the virtual image V at the reference position.

Figure 6:
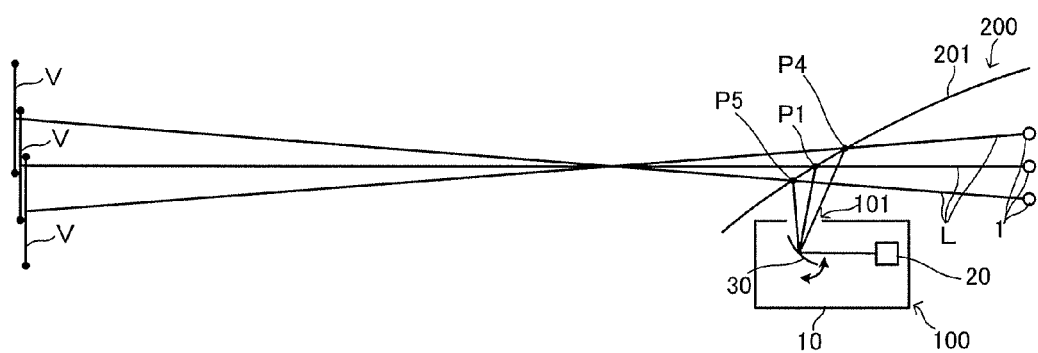
FIG. 6 is a schematic diagram for explaining a method of adjusting a projection position of display light according to a conventional example.

On the other hand, FIG. 6 shows the case where only the angle adjustment of the concave mirror 30 is performed depending on the height of the eye 1 of the observer (a conventional example). In this case, for recognizing the virtual image V when the position of the eye 1 of the observer is higher than the reference position, the first driving means 40 rotates to move the concave mirror 30 clockwise in FIG. 6, namely, to incline the upper end of the concave mirror 30 rearward, thereby adjusting the inclination angle of the concave mirror 30 more downward. As a result, the display light L emitted from the emitting part 101 is projected onto a projection point P4 located more upward the projection point P1 at the reference position, and the display light L reflected by the front glass 201 reaches the eye 1 of the observer. Therefore, the observer can recognize the virtual image V at a high viewpoint position, but as the emission angle of the display light L from the front glass 201 is uniquely defined, the position of the virtual image V moves in a vertical direction. To recognize the virtual image V when the position of the eye 1 of the observer is lower than the reference position, the first driving means 40 rotates to move the concave mirror 30 counterclockwise in FIG. 6, namely, to incline the upper end of the concave mirror 30 forward, thereby adjusting the inclination angle of the concave mirror 30 more downward. As a result, the display light L is projected onto a projection point P5 located more downward the projection point P1 at the reference position, and the display light L reflected by the front glass 201 reaches the eye 1 of the observer. Therefore, the observer can recognize the virtual image V at a low viewpoint position, but the position of the virtual image V moves in a vertical direction.

According to the head up display device 100 described in the above embodiment, it is possible to adjust a projection position of display light depending on the height of a viewpoint of an observer, without moving a virtual image in a vertical direction. This is achieved by the following configurations.

The head up display device 100 reflects the display light L representing a display image emitted from the display 20 by the concave mirror 30, and projects the display light to the front glass 201. The head up display device 100 comprises the case 10 that retains the display 20 and the concave mirror 30 in a prescribed positional relationship; a first driving means 40 that rotates the concave mirror 30; the second driving means 50 that moves the case 10 forward and rearward; and the control means 60 that operates the first and second driving means 40 and 50 according to a viewpoint position information of an observer, and adjusts a projection position of the display light L on the front glass 201 depending on a height of the observer's viewpoint.

Further, in such head up display device 100, the case 10 moves only in a longitudinal direction, a space required for the movement is reduced compared with moving in an arc shape, and upsizing of the head up display device 100 can be suppressed. Further, it is unnecessary to use a semi-transparent mirror for adjusting a projection position of the display light L, and brightness of a virtual image is not decreased.

Further, such head up display device 100 is provided with the general-purpose memory 63, which stores the correction values of the first and second driving means 40 and 50 corresponding to the viewpoint position information. The control means 60 operates the first and second driving means 40 and 50 based on the correction values.

The viewpoint position information is captured image information output from an imaging means for imaging the eye 1 of an observer. Further, the viewpoint position information is switch input information by the observer.

When the projection position of the display light L is different on the front glass 201 having a curved surface, a distortion of the virtual image V may be different depending the projection position. In such a case, the control means 60 may change the operating states of the first and second driving means 40 and 50, that is, the correction parameters for correcting the distortion of the virtual image V in accordance with the projection position of the display light L. The correction parameters are used for previously displaying distortion of a display image in the direction reverse to the distortion on the front glass 201 in order to suppress the distortion of the virtual image V projected on the front glass 201. For example, the general-purpose memory 63 stores a plurality of correction parameters in association with the control values of the first and second driving means 40 and 50. The CPU 61 of the control means 60 determines the correction parameters in accordance with the control values of the first and second driving means 40 and 50, which are determined by the control method described above, and outputs the correction parameters to the display 20. Thus, even when the projection position of the display light L on the front glass 201 is adjusted, the distortion of the virtual image V can be suppressed.

Further, the head up display device 100 may be provided with a folding mirror within the case 10 for reflecting back the display light L emitted from the display 20 toward the concave mirror 30.

Further, an organic EL (Electroluminescence) display, a projection-type display, and the like may be used as the display 20.

A combiner (projected member) that is projected by the display light L is not limited to the front glass 201 of the vehicle 200. A combiner that is projected by the display light L may be an exclusively provided combiner member.

In the above description, to facilitate the understanding of the present invention, a description of unimportant known technical matters is properly omitted.

INDUSTRIAL APPLICABILITY

The present invention is suitable for a head up display device.

DESCRIPTION OF REFERENCE NUMERALS

1 Eye of observer
10 Case
11 Rack
20 Display
30 Concave mirror
31 Gear
40 First driving means
41 Gear
50 Second driving means
51 Gear
60 Control means
61 CPU
62 ROM
63 General-purpose memory
64 Video memory
65 External interface
66 Input means
67 CAN bus
100 Head up display device
101 Emitting part
200 Vehicle
201 Front glass
L Display light
V Virtual image

The invention claimed is:

1. A head up display device for a vehicle, which reflects display light representing a display image emitted from a display by a concave mirror, and projects the display light to a combiner, the head up display device comprising:
   a case that retains the display and the concave mirror in a prescribed positional relationship;
   a first driving means configured to rotate the concave mirror;
   a second driving means configured to move the case forward or rearward in a longitudinal direction of the vehicle; and
   a control means configured to, in response to a signal indicative of information about a viewpoint position of an observer, adjust a projection position of the display light on the combiner by operating the first and second driving means, wherein
   the control means is configured to change a correction parameter for correcting distortion of a virtual image projected to the viewpoint position of the observer, in accordance with operating states of the first and second driving means.

2. The head up display device according to claim 1, comprising a memory for storing correction values of the first and second driving means corresponding to the viewpoint position information, wherein
the control means operates the first and second driving means based on the correction values.

3. The head up display device according to claim 1, wherein the viewpoint position information is captured image information output from an imaging means for imaging an eye of the observer.

4. The head up display device according to claim 1, further comprising an input means configured to receive the viewpoint position information input by the observer and output the signal indicative of the information about the viewpoint position of the observer to the control means.

5. The head up display device according to claim 1, wherein the control means is configured to control the first driving means to rotate the concave mirror in a counterclockwise direction and at the same time control the second driving means to move the case rearward in the longitudinal direction, or the control means is configured to control the first driving means to rotate the concave mirror in a clockwise direction and at the same time control the second driving means to move the case forward in the longitudinal direction.

6. A head up display device for a vehicle, which reflects display light representing a display image emitted from a display by a concave mirror, and projects the display light to a combiner, the head up display device comprising:
a case that retains the display and the concave mirror in a prescribed positional relationship;
a first driving means configured to rotate the concave mirror;
a second driving means configured to move the case forward or rearward in a longitudinal direction of the vehicle;
a control means configured to, in response to a signal indicative of information about a viewpoint position of an observer, adjust a projection position of the display light on the combiner by operating the first and second driving means, wherein
the second driving means comprises a gear and a motor for driving the gear, the gear of the motor being engaged with a rack disposed on the case; and a memory for storing correction values of the first and second driving means corresponding to the viewpoint position information, wherein the control means operates the first and second driving means based on the correction values, the control means is configured to change a correction parameter for correcting distortion of a virtual image projected to the viewpoint position of the observer, in accordance with operating states of the first and second driving means.

7. The head up display device according to claim 6, wherein the viewpoint position information is captured image information output from an imaging means for imaging an eye of the observer.

8. The head up display device according to claim 6, further comprising an input means configured to receive the viewpoint position information and output the signal indicative of the information about the viewpoint position of the observer to the control means.

9. The head up display device according to claim 6, wherein the control means is configured to control the first driving means to rotate the concave mirror in a counterclockwise direction and at the same time control the second driving means to move the case rearward in the longitudinal direction, or the control means is configured to control the first driving means to rotate the concave mirror in a clockwise direction and at the same time control the second driving means to move the case forward in the longitudinal direction.

10. A head up display device for a vehicle, which reflects display light representing a display image emitted from a display by a concave mirror, and projects the display light to a combiner, the head up display device comprising:
a case accommodating the display and the concave mirror in a prescribed positional relationship;
a first driving means configured to rotate the concave mirror;
a second driving means configured to move the case forward or rearward in a longitudinal direction of the vehicle; and
a control means configured to, in response to a signal indicative of information about a viewpoint position of an observer, adjust a projection position of the display light on the combiner, by controlling the first driving means to rotate the concave mirror in a counterclockwise direction and at the same time controlling the second driving means to move the case rearward in the longitudinal direction, or by controlling the first driving means to rotate the concave mirror in a clockwise direction and at the same time controlling the second driving means to move the case forward in the longitudinal direction, wherein the control means operates the first and second driving means based on the correction values, the control means is configured to change a correction parameter for correcting distortion of a virtual image projected to the viewpoint position of the observer, in accordance with operating states of the first and second driving means.

* * * * *